July 3, 1962 N. E. SPIESS, JR., ET AL 3,042,526
POWDER AGGLOMERATING METHOD AND APPARATUS
Filed Sept. 16, 1957
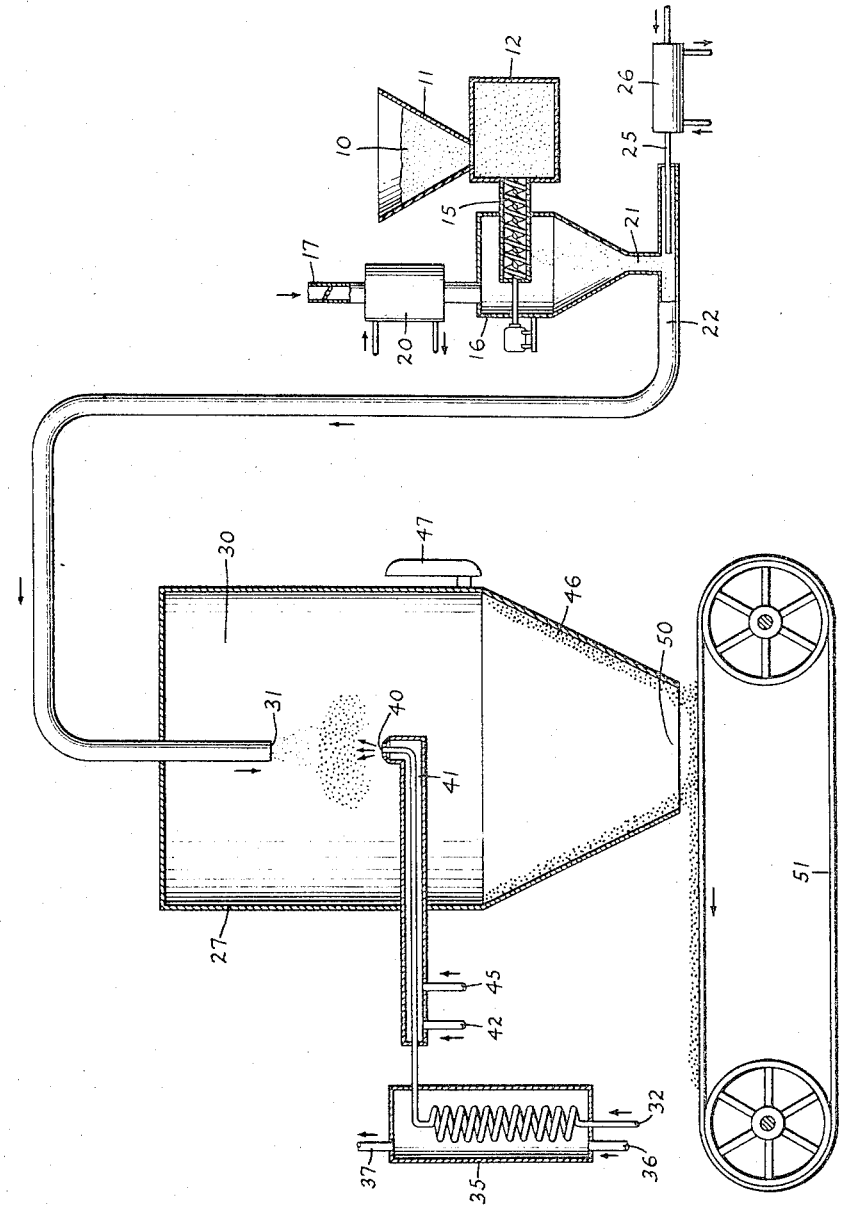
INVENTORS
NEIL E. SULLIVAN
NEWTON E. SPIESS, JR
BY
THEIR ATTORNEYS

United States Patent Office 3,042,526
Patented July 3, 1962

3,042,526
POWDER AGGLOMERATING METHOD AND APPARATUS
Newton E. Spiess, Jr., and Neil E. Sullivan, Oakdale, N.Y., assignors to National Dairy Products Corporation, New York, N.Y., a corporation of Delaware
Filed Sept. 16, 1957, Ser. No. 684,209
15 Claims. (Cl. 99—56)

This invention relates to a method and apparatus for producing an agglomerated powder.

Many products that are distributed as dry powders must be processed so that the individual particles fall within a specified size range. In many cases this means that the particles must be increased in size over that normally produced by conventional processes. In the spray drying of milk products, for example, particle sizes in the range of 10 to 40 microns are produced by conventional equipment. These very small particles wet too rapidly with the result that the powder forms lumps during reconstitution and is therefore difficult to dissolve. If the particles can be increased in size to a range of from 100 to 400 microns, a quick disoslving powder is obtained. In other cases fine particles are a disadvantage in that the powders are excessively dusty. Furthermore, a reduction in bulk density which is brought about by an increase in particle size is desired for consumer packaging, or a granular agglomerated product may present a more attractive consumer product and also may be handled more easily in commercial processes. The increase in particle size also tends to prevent the separation of the particles where mixtures of two or more ingredients are present.

The problems that are encountered with excessively fine powders may be alleviated by agglomeration techniques in which a number of small particles are cemented together to form larger masses. It is known, for example, that many materials may be agglomerated by wetting them with a liquid which will produce a tacky surface that cements the particles together. This wetting operation is normally followed by drying to remove the liquid. Several types of agglomerating equipment are in commercial use but the agglomerated products produced by using such equipment generally have one or another disadvantage depending upon the particular material that is treated.

Instant milk powders now on the market are produced by the agglomeration of ordinary spray dried powder or by direct spray drying to produce large single particles or by direct spray drying to produce an agglomerate product. In carrying out any such operation it is desirable that the product have excellent dispersibility in water, good solubility and lack of hygroscopicity without important sacrifice of flavor or storage stability. The product furthermore should have freedom from excessive bulk so as to economize on packaging, and lack of friability or fragility of the agglomerates. Products prepared by procedures using equipment heretofore known have suffered from a lack of at least one or usually several of the desirable attributes and characteristics of the products set forth above, most notably by excessive bulkiness and to a lesser extent fragility and friability of the agglomerates.

In some types of known agglomerating apparatus, in an effort to cause the particles to cohere, the pulverulent material has been subjected to mechanical forces such as those applied to the material in mixers or extruders. However, such mechanical force invariably has been too great and has not lent itself to the precise control that is necessary in order to produce agglomerates having desired particle size without forming a unified mass which must be broken up and/or reground.

Heretofore. it has been difficult to agglomerate powders of materials having limited solubility or a limited tendency to develop tack when moistened, inasmuch as the tackiness or solubility of the material has been relied upon to cause the sticking together of the finer particles to produce the agglomerates.

In other cases it has been desired to produce agglomerated products in which there is a chemical reaction between two powders such as the reaction between calcium lactate and sodium lactate to form a free-flowing crystalline double salt. It has been very difficult to produce such a product by using conventional equipment.

Among the objects of the present invention is to provide an improved process and apparatus for agglomerating a finely divided powder.

Another object is to provide such a method and apparatus which will produce a powder having improved properties as compared with products produced by methods and apparatus heretofore known.

Another object is to provide an agglomerating method and apparatus which will permit of the successful agglomeration of powders which heretofore have been difficult to agglomerate, such as those having limited solubility and little tendency to develop tack when moistened.

Yet another object of the invention is to agglomerate two powders which react with each other chemically or to form association compounds.

Still another object of the invention is to devise a way of preparing an agglomerated product wherein there is a chemical reaction between the powder and the agglomerating liquid.

Another object of the invention is to effect the agglomeration of a powder having a substantial proportion of fines, i.e. particles of a size of 80 mesh or smaller, into particles of a larger size, without forming large masses which require grinding or crushing equipment for further handling. Consistent with this object, it is desired that the final agglomerates be not larger than 10 mesh, and preferably not larger than 16 mesh.

In carrying out the method of the invention to obtain the foregoing and other objects and to realize the advantages of the invention, a stream of gas (the term being used herein to include both gases and vapors) carrying the pulverulent material is projected in a concentrated i.e., localized stream in a manner of a jet into a relatively large agglomerating chamber having an agglomerating zone therein. A stream or jet of an atomized agglomerating liquid which is capable of wetting the pulverulent material is also projected into the agglomerating zone in such a way that the two streams impinge directly on each other at an angle greater than 90°, preferably 180°. thereby to effect intimate mixing of the powder and the atomized liquid. As a result of having the streams meet a high velocity very intense mixing is secured. A high level of turbulence is created where the streams meet, eliminating the need for a large chamber or space which apparently has been regarded heretofore as necessary. The pulverulent material wetted with the agglomerating liquid is then maintained in suspension in the agglomerating zone for a period of time, while maintaining turbulence in the zone, for the wetted particles to come into contact with and stick to other particles in suspension, thereby to form agglomerates.

The mixture of pulverulent material and the carrier gas therefor are conveyed into the agglomerating zone by a conduit which terminates at a point in the zone and is so formed that a stream of gas and powder projects beyond the conduit into the zone as a relatively concentrated stream. In a similar manner the liquid and compressed gas which serves to atomize the liquid are carried into the agglomerating zone in conduits which terminate in the zone and are so formed and arranged with relation to each other to project the stream of the atomized liquid into the agglomerating zone. One feature of the invention is the introduction of the liquid and compressed gas into the zone through a two fluid nozzle, preferably having concentric channels with the liquid in the center channel and the gas in an annular channel. Such a two fluid nozzle provides optimum impact between the liquid and powder streams and desired high degree of turbulence.

By projecting the two streams beyond the terminal points of their respective conduits so that they impinge upon each other as opposed streams, there is effected an intimate mixing between the powder and the atomized liquid so that the particles of powder are wetted or coated by the particles of liquid and there is set up at a point intermediate the terminal points of the two conduits a mixing zone. The relative quantities of the two streams and the pressures at which they are introduced into the agglomerating zone are controlled so that the zone of mixing is maintained approximately midway between the terminal points of the two conduits, and not in contact with either, so as to avoid the accumulation of powder and the appearance of substantial quantities of liquid on the terminal point of either conduit. Moreover, the relative quantities of atomized liquid, liquid vapor and powder are controlled so as to provide the amount of liquid that is necessary to produce agglomeration of the powder without having an excessive quantity of liquid which might produce unduly large agglomerates or agglomerates which are too hard or too sticky or which have an inadequate quantity of liquid which might produce excessively fine particles or a high proportion of dusty material.

Surrounding the mixing zone in the agglomerating chamber is an agglomerating zone wherein there is maintained a degree of turbulence which causes gentle impacts between wetted powder particles. In this way a certain number of the particles adhere to each other thereby to form agglomerates. Furthermore, by the impact of the wetted powder particles against the walls of the agglomerating chamber, the growth and the size of the agglomerates is increased until they attain the desired particle size.

The amount of solvent in the agglomerating chamber is controlled and maintained at a value which may be necessary to produce agglomerates that are free-flowing and have desired properties from the standpoint of freedom from high hygroscopicity. Accordingly, in some cases it is preferred to inject a solvent in the vapor phase into the agglomerating chamber, preferably mixed with the gas that is used to atomize the wetting liquid. The amount of solvent and its vapor pressure within the agglomerating zone are controlled so as to induce either the drying of the agglomerated particles or the accumulation of such an amount of solvent by the particles as may be required to obtain optimum properties in the final product.

The temperature in the agglomerating zone is preferably controlled independently of the amount of solvent and liquid which is added thereto. Since the temperature and the amount of liquid or solvent which may be required may affect the degree of agglomeration and the crystallization of the powder, if the formation of crystals is a factor in the operation, it is important that in a versatile operation the temperature be controlled independently of the amount of solvent that is added and the other variables. This requirement is in contrast to known operations in which the solvent is vaporized and allowed to condense upon the particles of pulverulent material. In the latter case the temperature of the operation is directly dependent upon the amount of solvent used and therefore very often the desired flexibility which is needed to produce the conditions necessary for effective agglomeration can not be maintained. It is preferred, therefore, to control temperature, the amount of solvent and the amount of agglomerating liquid in the agglomerating zone separately and independently of each other so that the operation has the flexibility which may be necessary, and often is necessary, to produce the conditions for effective agglomeration of any particular pulverulent material.

The principles of the invention are advantageously applied to the agglomeration of milk powders, meaning a material of lacteal origin such as whole milk powder, skim milk powder, skim milk powder with part of the salts removed, etc.

The invention will now be described and discussed both in its procedural and in its apparatus aspects by reference to the attached drawing which is a diagram, partly schematic, indicating the relationship of the various component parts.

A supply of puverulent material 10 is maintained in a hopper 11 to provide a continuous supply to a powder dispensing and proportioning device 12. The powder is fed in a controlled and measured amount from the feeder 15 into an air-powder mixing chamber 16 where it is mixed with a stream of air flowing through the pipe 17 which may, if desired, be heated or cooled depending upon the conditions that it is desired to maintain, in the heat exchanger 20. The powder and the air from the mixing chamber 16 flow through the pipe 21 into the pipe 22 where there is injected a stream of air or other gas through the pipe 25, which may be heated or cooled as desired in the heat exchanger 26. The gas jet 25 serves not only to pick up and carry the powder through the pipe 22 but also to draw in by aspiration a stream of gas through the pipe 17.

The gas stream with the pulverulent material suspended therein flows through the pipe or conduit 22 into the agglomerating chamber 27 which is formed with walls that enclose an agglomerating zone 30 therein. The conduit 22 terminates at 31 and projects the relatively concentrated gas stream into the relatively large agglomerating zone 30.

A supply of agglomerating liquid is fed through the pipe 32 which is provided with a jacket 35 for heating or cooling the liquid by any transfer medium such as water, which may enter the jacket at 36 and leave at 37. The liquid at the proper temperature continues its flow through the pipe 32 to the nozzle 40 where it is picked up by the stream of compressed air or other gas which flows through the annular conduit 41 and atomized into fine droplets. Solvent vapor produced and if desired also heated in apparatus not shown in the drawing is introduced to and mixed with the atomizing gas in the annular conduit 41 through the pipe 45. The amount and the temperature of the solvent vapor is controlled in accordance with the objectives described and discussed above and the particular material which is being agglomerated, in order to produce and maintain the solvent vapor pressure and concentration in the agglomerating zone 30 as desired.

Between the powder-gas inlet 31 and the nozzle 40 there is a zone of intersection of the two streams where intense mixing takes place with resulting moistening of the powder by the droplets of atomized liquid. This moist powder now passes towards the walls of the chamber 27 carried by the air and vapor introduced through the conduits 22 and 41. As a result of the turbulence in the stream plus the gentle impact at the walls of the chamber, cementing of the small particles into larger agglomerates takes place. These relatively large agglomerated particles settle on the outlet cone 46 of the agglomerating chamber 27 and by the action of the vibrator 47 drop through the outlet 50.

The product now having been satisfactorily agglomerated, various handling techniques may be employed, depending upon the characteristics of the product. In some cases crystallization will absorb the solvent, and a dry product will be obtained simply by holding it upon a conveyor belt such as that shown at 51 for a period of time. In other cases the agglomerates may be dropped into a dryer not shown, for example, a direct hot air rotary dryer or a vibrating conveying dryer for the removal of the solvent. In other cases where the objective is to coat the powder particles with a component of the wetting liquid, the agglomerated product may simply be cooled on the conveyor belt 51. If needed, a device may be used, such as a Stokes model 43–B oscillating granulator, to force the material through a screen immediately after it leaves the agglomerating chamber, thereby providing a higher degree of uniformity of the particles and promoting crystallization of the material where this is desired.

It will be appreciated that the system described meets all of the requirements stated above. The temperature in the agglomerating zone may be varied by heating or cooling the air which enters at 17 or through the pipe 25 or by increasing the amount of vaporized solvent which enters at 45 or by varying the temperature of the agglomerating liquid feed which enters through the pipe 32. The quantity of solvent added may be varied independently of temperature, and the degree of atomization may be controlled by varying the liquid input through the pipe 32 and the nozzle 40, and by varying the pressure in the pipe 41. The vapor pressure of the solvent in the agglomerating zone may be controlled and varied by increasing or decreasing the amount of solvent which is introduced through the pipe 45 relative to the amount of air which enters at 42, 17 and 25. Finally the mechanical action received by the powder is very slight, consisting only of the vibration needed to cause the moistened material to slide out of the cone 46 of the agglomerating chamber. If the product is such that more intense mechanical action is needed in order to obtain adequate cementing of the powder particles, greater than that which can be achieved by varying the liquid input, it may of course be provided by substituting mixing devices of conventional design in place of the conveyor 51. It is clear that other methods of mounting the powder inlet conduit 31 and the atomizing nozzle 40 may give the desired result. For example, they may be arranged so that the two streams intersect at an oblique angle rather than being directly opposed. However, the procedure and the apparatus described have been found to give the best results.

The invention will now be described in terms of several specific procedures which may be used to cause the agglomeration of powders of certain materials.

*Example 1*

It is well known that skim milk powder moistened with water develops a considerable degree of tackiness and will cement to form agglomerates. By the process of the present invention, skim milk powder has been agglomerated successfully as follows. Two pounds per minute of skim milk powder were fed through the powder measuring and proportioning device 12 and were dispersed in an air stream to give a velocity of 7000 feet per minute in a standard one inch pipe 22. Water at room temperature and a flow rate of 0.167 lb. per minute was fed through the pipe 32. Compressed air at a pressure of 40 lbs. per square inch gauge was fed to the atomizing nozzle through the pipe 42. A sufficient amount of steam was introduced through the pipe 45 to produce a temperature in the agglomerating zone 30 of 120° F. The indicated rate of air flow through the pipe 22 and the pressure at the nozzle 40 were selected in order to obtain complete atomization of the water which was admitted through the pipe 32 and to balance the zone of mixing about midway between the terminus 31 of the conduit 22 and the nozzle 40. With other powder flow rates or other types of nozzles it may be necessary to vary the quantity of air passing through the pipe 22 by varying the air pressure in the pipe 25 so as to maintain the zone of mixing at or approximately at this mid point. If the flow of air through the pipe 22 is too small, the end of the conduit 31 may become coated with extremely wet material. On the other hand, if the flow through the pipe 22 is too great, the nozzle 40 may become coated thereby interfering with effective atomization of the wetting liquid. Under the conditions described, however, the agglomerated product which passed through the discharge port 50 was dried immediately to yield a noncrystalline, instantly dispersible powder when added to water having a particle size of 10 to 100 mesh. It may be held in a warm condition for an appropriate length of time to obtain a dispersible product with any desired level of lactose crystallization. For example, the moist powder from the agglomerating zone 30 at 120° F. can be held for ten minutes on an open conveyor belt such as that shown at 51 before it is dried, to yield a product in which about 45% of its lactose content is crystallized. At this level of crystallization the product is non-hygroscopic under most conditions of handling and contains about 4% moisture.

*Example 2*

Crystalline lactose has in the past been a very difficult material to agglomerate because it is very slowly soluble in most solvents and has very little tendency to develop tackiness when moistened. This product has been successfully agglomerated in the equipment and by following the method of the present invention, as follows. A flow of lactose powder from the powder measuring device 12 was maintained at 0.75 pound per minute and the air velocity in the standard one inch pipe 22 at 7000 feet per minute. The input of air through the pipe 42 to the atomizing nozzle 40 was 45 pounds per square inch gauge. No solvent vapor was admitted through the pipe 45. The liquid introduced through the pipe 32 was a water solution saturated with lactose. It was heated in the heater 35 to 130° F. Under these conditions, the vapor pressure of the solvent was very low in the agglomerating zone 30 and the evaporation of water from the lactose solution which was used to wet the powder, produced a sticky condition which cemented the particles together. The agglomerated product was then passed through a F. J. Stokes granulator (not shown in the drawing), having a 10 mesh screen and a horizontal octagonal bar to produce uniform granule size and to toughen the particles where needed. The product was then dried in a Jeffrey-Traylor direct heat vibrating dryer. Thus with the same agglomerating equipment that successfully brought about the agglomeration of a very sticky skim milk powder, conditions were maintained which brought about the agglomeration of lactose which has very little tackiness when moistened. The particle strength and moisture content are such that the product may be tableted in automatic equipment commercially available for that purpose.

*Example 3*

When combined at approximately 1:1 ratio of equivalents of calcium and sodium, calcium lactate and sodium lactate form a crystalline double salt. This material has been very difficult to prepare in the form of a free-flowing powder using conventional equipment. However, it was prepared using the method and the apparatus of the present invention as follows. A powdered mixture of 75% calcium lactate and 25% sodium lactate, and 1% of a previously crystallized mixture of approximately equal parts of calcium and sodium lactate was introduced to the mixing chamber 16 at a rate of 150 pounds per hour. This was conveyed at an air velocity of 6500 feet per minute through a standard 1½-inch pipe 22 by injecting a stream of air through the pipe 25. A 65% solution of sodium lactate in water was fed at a rate of 150 pounds per hour through the pipe 32 and the heat exchanger 35, where its temperature was raised to 120° F. Air and steam at 70 pounds per square inch gauge were admitted through the pipes 42 and 45, respectively, in such ratio as to give a temperature in the agglomerating zone of 110° F. In the mixing zone the powdered calcium-sodium lactate mixture was moistened by the sodium lactate solution so that the atomic ratio of calcium to sodium became about 1:2. Under the moist warm conditions in the agglomerating zone 30, crystallization began to occur and the water introduced with the sodium lactate and in the form of steam flowing through the pipe 45 was taken up as water of crystallization. Under the influence of the vibrator 47, the product dropped from the discharge port 50 into a Stokes granulator (not shown) of the type described in Example 2 having a 4 mesh screen and thence onto the conveyor belt 51 where, after a twenty minute holding period, it was bagged as a nondusting, relatively non-hygroscopic granular, free flowing product having particle size from 6 to 100 mesh and having a moisture content of about 17%.

*Example 4*

Sodium caseinate is normally prepared by reacting casein which aqueous solutions of sodium carbonate or sodium hydroxide in a tank to produce a solution of sodium caseinate. The resulting product must then be dried from a relatively high moisture concentration to a very low moisture content. The over-all operation is cumbersome and uneconomical. It is found that the operation can be carried out more economically using the equipment of the present invention, as follows. Casein having a particle size of approximately 100 mesh was fed at a rate of 1.5 pounds per minute through the measuring mechanism 12. Unheated air was admitted through the inlet 17. The amount of air injected through the pipe 25 was sufficient to produce a rate of flow of about 6500 feet per minute through the pipe conduit 22 which was a standard 1 in. pipe. A cold sodium carbonate solution was pumped into the apparatus at the inlet 32. Atomizing air at a pressure of 50 p.s.i. gauge was introduced through the pipe 42. No steam or other vapor was admitted through the pipe 45. Under these conditions mixing of the atomized sodium carbonate solution with the powdered casein occurred in the mixing zone in the agglomeration chamber 27 and under the conditions in the agglomerating zone 30 a reaction occurred which resulted in the formation of sodium caseinate. A crumbly relatively dry product was discharged through the port 50 and after holding on a conveyor belt for 2 minutes required only a relatively small amount of drying in order to produce a free flowing powder.

*Example 5*

A skim milk which had been enriched with protein by the addition of casein thereto, and is available on the market as "Sheffield's Protein 60" was agglomerated by the same procedure as that described in Example 1, except that the rate of flow of water through the pipe 32 was 0.2 pound per minute. The agglomerated product passed through the discharge port 50 and was dried in a rotary air dryer to yield a non-crystalline powder having most of the particles in the size of 10–100 mesh, which dispersed instantly in water.

*Example 6*

Following the procedure described in Example 2, a mixture of 90 parts by weight of lactose and 10 parts of starch was prepared in the air-powder chamber 16. The powdered lactose was introduced through the hopper 11 and proportioning device 12—15. The powdered starch was fed through a similar hopper and proportioning device not shown in the drawings, also to the chamber 16. The two powders flowing through the pipe 21 into the fluidizing tube 22 were intimately mixed by the time they reached the outlet 31. The particle size, strength and the moisture content of the agglomerated product were satisfactory and similar to the product of Example 2.

*Example 7*

Following the procedure described in Example 1, low sodium skim milk powder having a sodium content of about 0.03% (i.e. less than 10% of that of normal milk) which was seeded with 1% by weight of seed lactose was agglomerated. The wet product was allowed to drop through the opening 50 onto the belt 51, where it was allowed to set through crystallization of the lactose. It was then sized through a 10 mesh screen and dried in a rotary dryer using parallel current air flow. The resulting product had excellent dispersibility in water.

*Example 8*

Following the procedure described in Example 1 (including moistening at 130° F. with a combination of water and steam introduced through the two-fluid nozzle) "Krageleen" powder was agglomerated. "Krageleen" is a mixture of carrageenin (a hydro colloid extracted from sea plants, sometimes called Irish moss), gum arabic, calcium carbonate and a small percentage of corn sugar. The moistened and agglomerated powder dropped from the agglomerating chamber 27 into an F. J. Stokes granulator (not shown in the drawing) containing a 4 mesh screen and from there into a rotary dryer (not shown in the drawing) where it was dried concurrently with air introduced at 325° F. The moisture content of the powder as it entered the dryer was about 33%, and the dried product contained 9–11% moisture.

*Example 9*

Whole milk powder when agglomerated by usual techniques does not have the instant dispersibility that is obtained by agglomeration of skim milk powder. It has been discovered, however, in accordance with the invention of Tumerman and Maddock, which is to be covered in a co-pending United States patent application, that a combination of agglomeration with the application of a thin film of lecithin on the whole milk powder surface results in a highly dispersible milk powder. Using the equipment of the present invention the following procedure is used. Normal spray dried whole milk powder is fed at a rate of about 1½ pounds per minute through the measuring mechanism 12. Unheated air is admitted through inlet 17. The amount of air injected through pipe 24 is sufficient to produce a rate of flow of about 6,500 feet per minute through pipe conduit 22, which is standard 1" pipe. An emulsion of lecithin in water is pumped into the apparatus at inlet 32. This emulsion can be made by homogenizing a commercial solution of 60% lecithin in 40% of soybean oil into the required amount of water. Atomizing air at a pressure of 50.0 p.s.i.g. is introduced through the pipe 42. No steam or other vapor is admitted through pipe 45. Under these conditions the atomization of the lecithin emulsion by nozzle 40 and the intense mixing in the agglomeration chamber results in coating of the whole milk particles with a thin film of lecithin while at the same time the particles are agglomerated to produce a larger particle size in the milk powder. The moist lecithinized milk powder, now containing about ½% of the lecithin and 12–15% water based on the dry powder, drops from port 50 into a rotary dryer, vibrating conveyor dryer or other convenient means of removing the moisture.

Although specific embodiments of the invention have been described, it will be apparent to those skilled in the art that there are many modifications and equivalents within the scope of the teaching of the invention as presented herein. For example, the invention may be applied to the agglomeration of powdered foods such as fruit or coffee, and flavor and aroma ingredients which are separated in previous operating steps may be added to the powders in the agglomerating chamber by way of the agglomerating liquid. Accordingly, it is intended that all such modifications and equivalents be included within the scope of the appended claims.

We claim:

1. The method of agglomerating pulverulent material which comprises projecting a localized stream of an inert gas carrying said material into a relatively large agglomerating chamber, and projecting a second localized stream comprising an inert gas and an atomized liquid which is capable of wetting said pulverulent material into said chamber in such a way that the two streams impinge directly on each other at an angle greater than 90° thereby to effect intimate mixing of the powder and the atomized liquid and wetting of the powder in a mixing zone, maintaining an agglomerating zone for the wetted particles surrounding said mixing zone, and maintaining said material in suspension in said mixing and agglomerating zones for a period of time sufficient for the liquid to wet the material and for the wetted material to form agglomerates.

2. The method of claim 1 wherein the relative velocities of the two gas streams and the amounts of liquid and powder are controlled to maintain the zone of mixing intermediate between the terminal points of the two conduits which convey the respective streams into the agglomerating chamber, and so that the mixing zone does not extend to the terminal points of either conduit.

3. The method of claim 2 wherein turbulence is maintained in the agglomerating zone by the two gas streams so as to produce impact of the wetted particles upon each other and upon the walls of the agglomerating chamber thereby to bring about agglomeration of the wetted particles.

4. The method of claim 1 wherein the vapor of a material which is at least a partial solvent for the pulverulent material is injected into the agglomerating chamber, and the amount thereof is controlled to produce a partial pressure approximately equal to the vapor pressure of the solvent at the temperature within the agglomerating zone.

5. The method of claim 4 wherein the temperature in the agglomerating zone is controlled independently of the amount of solvent added thereto.

6. The method of claim 1 wherein the pulverulent material is skim milk powder having a substantial proportion of particles below a size of 40 microns and the liquid is water.

7. The method of claim 4 wherein the pulverulent material is skim milk powder having a substantial proportion of particles below 40 microns, the liquid is water and the solvent vapor is steam.

8. The method of claim 1 wherein the powder is lactose having a substantial proportion of particles below 80 mesh and the liquid is a water solution of lactose.

9. The method of claim 1 wherein the powder is a mixture of a relatively greater molar amount of calcium lactate and a relatively smaller proportion of sodium lactate and the liquid is an aqueous solution of sodium lactate in an amount sufficient together with the powdered sodium lactate, to produce a mixture of substantially equivalent amounts of calcium lactate and sodium lactate, and steam is added to the agglomerating chamber in an amount sufficient to produce a crystalline double salt of calcium-sodium lactate.

10. The method of claim 1 wherein the pulverulent material is casein having a particle size predominately not substantially above 100 mesh and the liquid is an aqueous alkaline solution comprising an alkali metal cation in an amount sufficient to produce alkali metal caseinate and the agglomerated product is a free-flowing alkali metal caseinate powder.

11. The method of claim 1 wherein the pulverulent material has a substantial proportion of particles below a size of 80 mesh and the size of the agglomerated particle is not substantially greater than 10 mesh.

12. The method of claim 11 wherein the particle size of the agglomerates is not greater than 16 mesh.

13. Apparatus for agglomerating pulverulent material comprising a relatively large chamber formed with walls enclosing an agglomerating zone having a mixing zone therein, means for feeding a stream of gas carrying pulverulent material to said chamber, said means comprising a first conduit having a terminal portion directed towards said mixing zone and being so formed as to localize said powder-gas stream, means for producing an atomized spray of a liquid which is capable of wetting said pulverulent material in said mixing zone, said atomizing means comprising a conduit for conveying a second gas stream under pressure to said chamber to a point adjacent said mixing zone and a conduit for conveying said liquid to said chamber to a point adjacent said mixing zone, said second gas conduit and said liquid conduit being so arranged with relation to each other as to produce a localized spray of said liquid directed towards said mixing zone, said powder-gas conduit on the one hand and said gas conduit and said liquid conduit on the other hand being so arranged with relation to each other that the stream of powder-gas and the stream of atomized liquid impinge directly upon each other at an angle greater than 90°.

14. The apparatus described in claim 13 wherein the first conduit is arranged so as to project the powder-gas stream substantially vertically downwardly and the second gas conduit and liquid conduit are arranged so as to project the stream of atomized liquid substantially vertically upwardly and substantially coaxially with the powder-gas stream.

15. Apparatus as described in claim 13 wherein the second gas conduit is a pipe surrounding the liquid conduit so as to provide an annular passage for the flow of atomizing gas.

References Cited in the file of this patent

UNITED STATES PATENTS

| | | |
|---|---|---|
| 843,938 | Glas | Feb. 12, 1907 |
| 2,016,592 | Chuck | Oct. 8, 1935 |
| 2,684,290 | Alexander et al. | July 20, 1954 |
| 2,711,557 | Russell | June 28, 1955 |
| 2,755,502 | Herr | July 24, 1956 |
| 2,835,586 | Peebles | May 20, 1958 |
| 2,851,364 | Peebles | Sept. 9, 1958 |